(12) United States Patent
Chien et al.

(10) Patent No.: US 9,787,128 B2
(45) Date of Patent: Oct. 10, 2017

(54) WIRELESS CHARGER AND WIRELESS CHARGING METHOD

(71) Applicant: HON HAI PRECISION INDUSTRY CO., LTD., New Taipei (TW)

(72) Inventors: Yu-Ching Chien, New Taipei (TW); Chuang-Wei Tseng, New Taipei (TW); Che-Hsun Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 267 days.

(21) Appl. No.: 14/805,055

(22) Filed: Jul. 21, 2015

(65) Prior Publication Data
US 2017/0025882 A1    Jan. 26, 2017

(51) Int. Cl.
*H02J 7/00* (2006.01)
*H02J 7/02* (2016.01)
*H02J 50/23* (2016.01)

(52) U.S. Cl.
CPC .............. *H02J 7/025* (2013.01); *H02J 50/23* (2016.02)

(58) Field of Classification Search
CPC ...... H01F 38/14; Y02T 90/122; B60L 11/182; Y02E 60/12
USPC ........................................................ 320/108
See application file for complete search history.

(56) References Cited

U.S. PATENT DOCUMENTS

| | | | | |
|---|---|---|---|---|
| 2002/0171396 A1* | 11/2002 | Pettinato | ............... | H02J 7/0044 320/111 |
| 2003/0111978 A1* | 6/2003 | Wang | ..................... | H02G 11/02 320/114 |
| 2010/0007307 A1* | 1/2010 | Baarman | ................. | H02J 5/005 320/108 |
| 2012/0242285 A1* | 9/2012 | Jung | ..................... | H02J 7/0029 320/108 |
| 2013/0214730 A1* | 8/2013 | Lu | ........................... | H02J 7/007 320/107 |
| 2014/0042969 A1* | 2/2014 | Miller | ................... | H02J 7/0042 320/111 |
| 2015/0015419 A1* | 1/2015 | Halker | ................ | B60L 11/1827 340/901 |
| 2016/0204642 A1* | 7/2016 | Oh | ......................... | H02J 17/00 320/108 |
| 2016/0380467 A1* | 12/2016 | Shao | ....................... | H02J 7/025 320/108 |

* cited by examiner

*Primary Examiner* — Arun Williams
(74) *Attorney, Agent, or Firm* — Steven Reiss

(57) ABSTRACT

A wireless charger includes a wireless charging transmitter. The wireless charging transmitter includes a transmission antenna, a driving circuit, a transmission temperature sensor, and a controller. The driving circuit can output a charging signal in a fast charging mode initially. The transmission temperature sensor can detect a transmission temperature value of the transmission antenna. The controller can receive the transmission temperature value from the transmission temperature sensor. The driving circuit is can output the charging signal in a fast charging mode initially. When the transmission temperature value is greater than an overheat value, the controller can control the driving circuit to output in a slow charging mode.

12 Claims, 3 Drawing Sheets

WIRELESS CHARGER AND WIRELESS CHARGING METHOD

FIELD

The subject matter herein generally relates to a wireless charger and wireless charging method.

BACKGROUND

Wireless charging uses an electromagnetic field to transfer power between two objects. This is usually done with a charging station. Power is sent through an inductive coupler, coupling to an electrical device, which can then use that energy to charge batteries or run the device.

BRIEF DESCRIPTION OF THE DRAWINGS

Implementations of the present technology will now be described, by way of example only, with reference to the attached figures.

DETAILED DESCRIPTION

Figure 1:
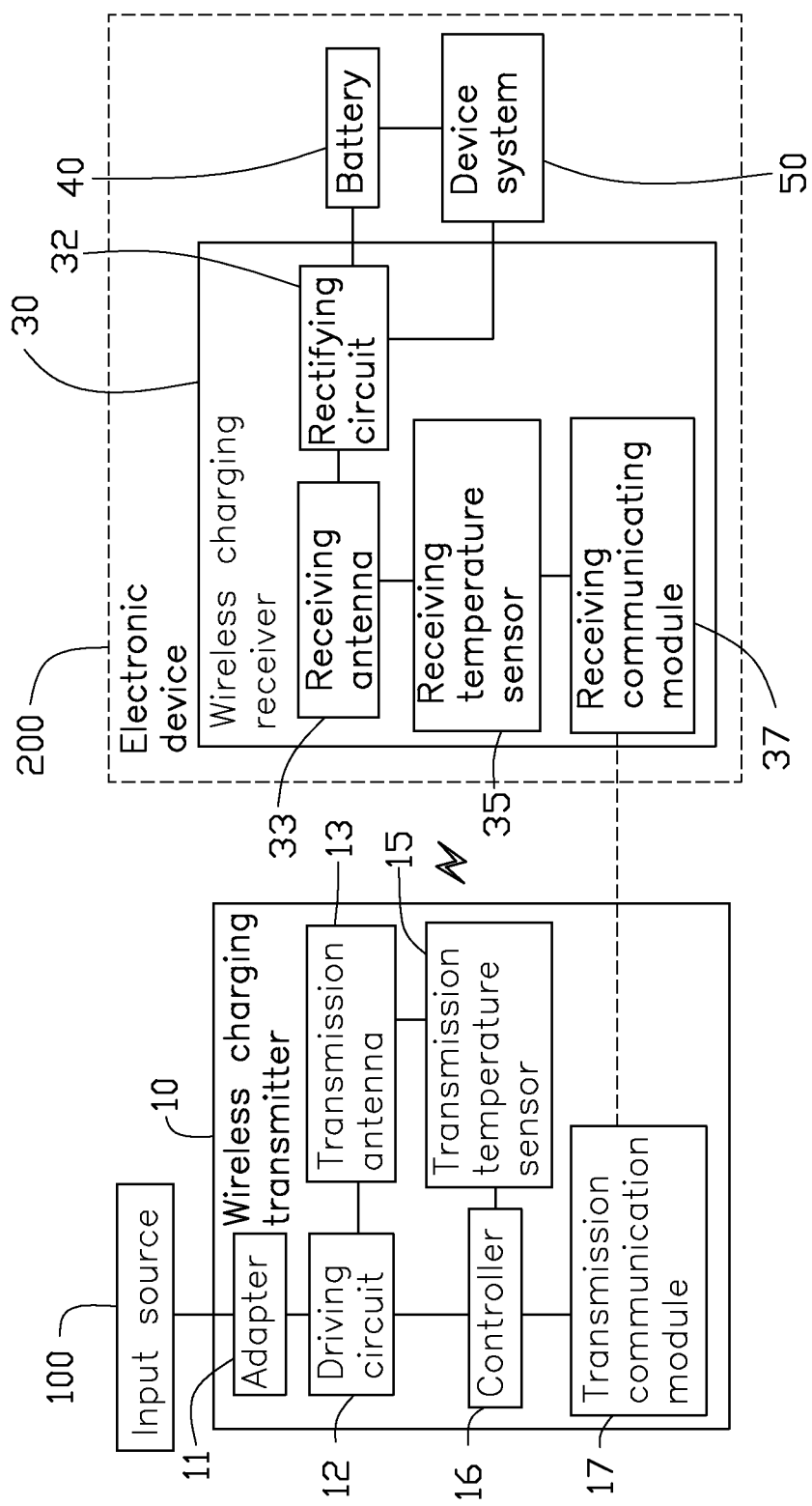
FIG. 1 is a diagrammatic view of a wireless charger in one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 illustrates a diagrammatic view of a wireless charger in one embodiment. The wireless charger includes a wireless charging transmitter 10 and a wireless charging receiver 30. The wireless charging transmitter 10 is coupled to an input source 100. The wireless charging transmitter 10 can charge the wireless charging receiver 30 through electromagnetic induction. The wireless charging receiver 30 can be integrated in an electronic device 200 for charging a battery 40 and a device system 50. The electronic device 200 can be a laptop computer, a tablet computer, a smart phone, or a wearable device.

The wireless charging transmitter 100 includes an adapter 11, a driving circuit 12, a transmission antenna 13, a transmission temperature sensor 15, a controller 16, and a transmission communication module 17. The wireless charging receiver 30 includes a rectifying circuit 32, a receiving antenna 33, a receiving temperature sensor 35, and a receiving communication module 37.

The adapter 11 can convert a direct current to an alternative current for supplying the driving circuit 12.

The driving circuit 12 is coupled to the transmission antenna 13 and the controller 16. The driving circuit 12 can output a charging signal in different modes which can have different output power. The driving circuit 12 can output the charging signal in a fast charging mode initially.

The transmission antenna 13 can output the charging signal to the wireless charging receiver 30. In one embodiment, the transmission antenna 13 can output the charging signal under electro-magnetic induction. When output power of the charging signal is increased, heat generated from the transmission antenna 13 can increase. More heat damage can reduce a transfer efficiency of the wireless charger.

The transmission temperature sensor 15 is coupled to the transmission antenna 13 and can detect and receive a transmission temperature value of the transmission antenna 13.

The controller 16 is coupled to the driving circuit 12, the transmission temperature sensor 15, and the transmission communication module 17. The controller 16 can control the driving circuit 12 to output the charging signal.

The transmission communication module 17 can communicate with the wireless charging receiver 30.

The receiving antenna 33 can be coupled to the transmission antenna 13 and receive the charging signal from the transmission antenna 13.

The rectifying circuit 32 can receive and rectify the received charging signal from the receiving antenna 33 and output to the battery 40 and the device system 50.

The receiving temperature sensor 35 is coupled to the receiving antenna 33 and can detect and receive a receiving temperature value of the receiving antenna 33.

The receiving communicating module 37 can communicate with the transmission communication module 17 and transmit the receiving temperature value to the controller 16. The transmission communication module 17 and the receiving communicating module 37 can communicate via some wireless communicating protocols, such as WiFi, Bluetooth, or Zigbee.

When the transmission temperature value is greater than an overheat value, the controller 16 can control the driving circuit to output in a slow charging mode. A first output power in the fast charging mode is greater than a second output power in the slow charging mode. When the receiving temperature value is greater than the overheat value, the controller 16 can control the driving circuit 12 to output in the slow charging mode.

Figure 2:
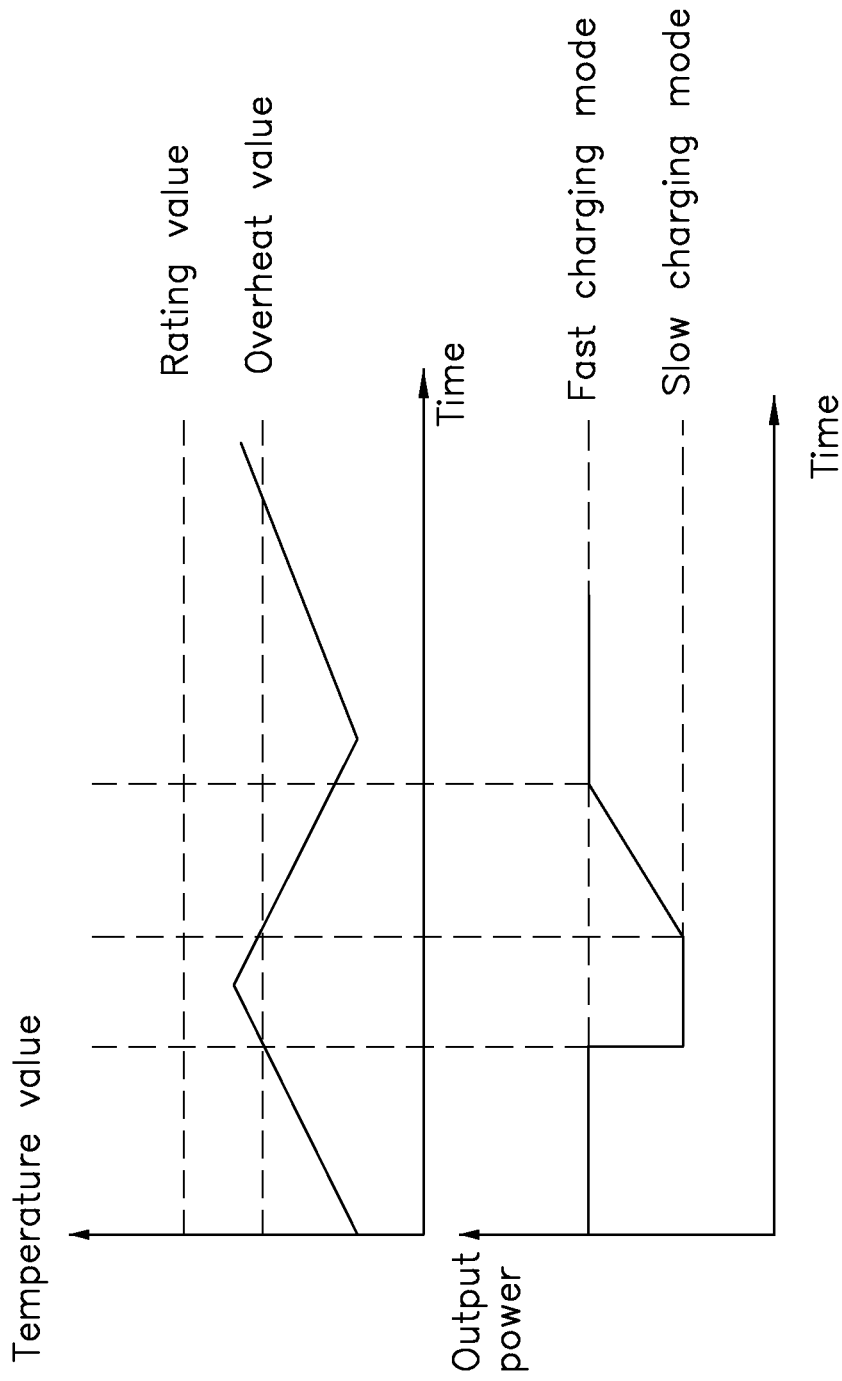
FIG. 2 is a diagram showing changes of a temperature value and an output power varying with time in one embodiment.

FIG. 2 illustrates a diagram showing changes of a temperature value and an output power varying with time. When the wireless charger is used, the driving circuit 12 outputs a charging signal in a fast charging mode initially. The wireless charging receiver 30 receives the charging signal to charge the battery 40 and the device system 50. Heat generated from the transmission antenna 13 and the receiving antenna 33 rises. The controller 16 can receive a transmission temperature value from the transmission antenna 13 through the transmission temperature sensor 15 and receive a receiving temperature value from the receiving antenna 33 through the receiving temperature sensor 35. When one of the transmission temperature value and the receiving temperature value is greater than an overheat value, the controller 16 controls the driving circuit to output in a slow charging mode. A first output power in the fast charging mode is greater than a second output power in the slow charging mode. When the transmission temperature sensor 15 and the receiving temperature sensor 35 detect a changed transmission temperature value which is smaller than the overheat value drops down from a value greater than the overheat value, the controller 16 can control the driving circuit 12 to switch the slow charging mode to the fast charging mode gradually. When the receiving temperature value and/or the transmission temperature value are greater than a rating value, the controller 16 can stop the driving circuit 12 from outputting the charging signal. The rating value is greater than the overheat value.

Figure 3:
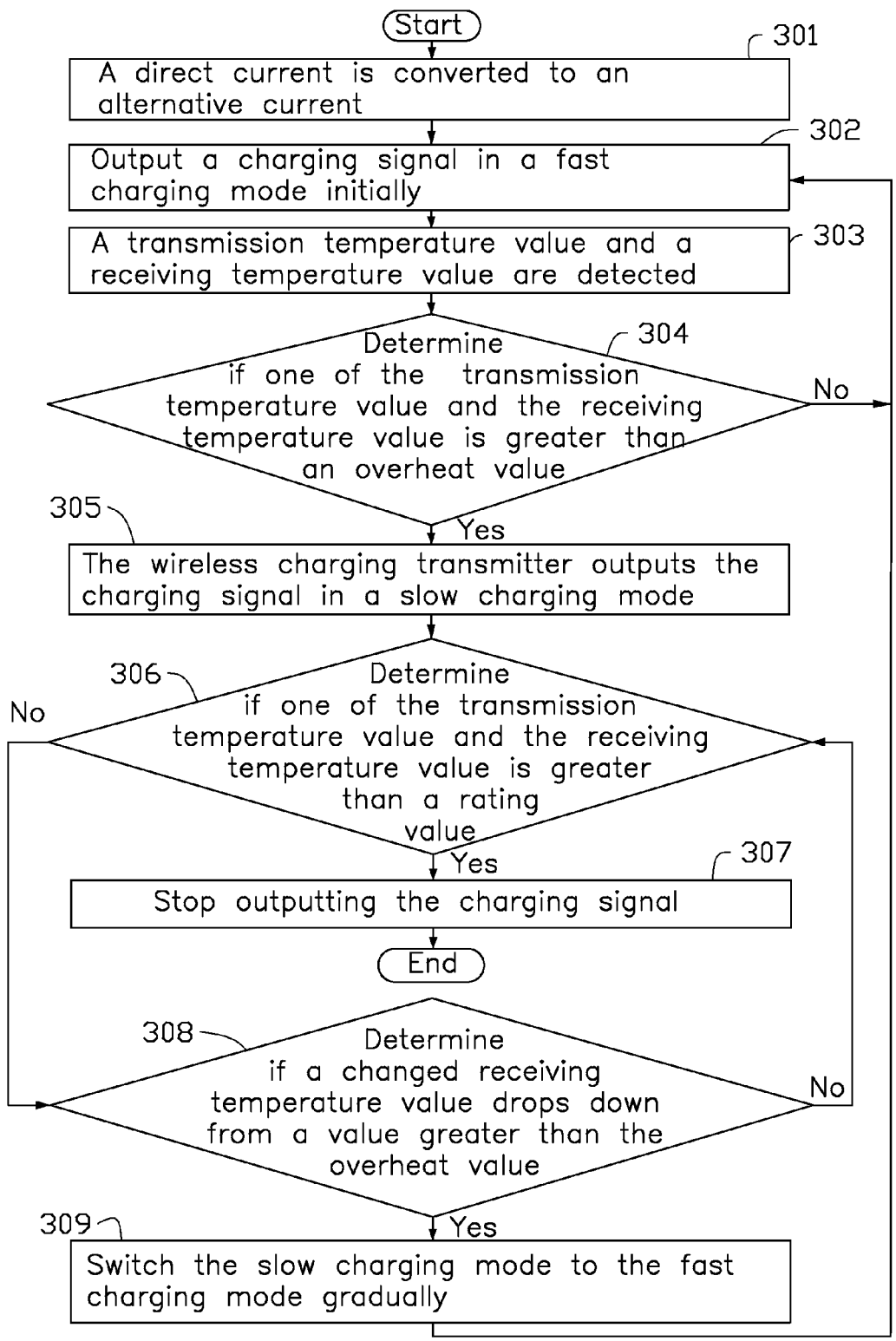
FIG. 3 is a flowchart of a wireless charging method.

The overheat value for the wireless charging transmitter 10 and a wireless charging receiver 30 may be the same or different. Similarly, the rating value for the wireless charging transmitter 10 and a wireless charging receiver 30 may be the same or different, FIG. 3 illustrates a flowchart of a wireless charging method. The example method is provided by way of example, as there are a variety of ways to carry out the method. The operating method described below can be carried out using the configurations illustrated in FIG. 1, for example, and various elements of these figures are referenced in explaining the example method. Each block shown in FIG. 3 represents one or more processes, methods or subroutines, carried out in the example method. Furthermore, the illustrated order of blocks is illustrative only and the order of the blocks can change according to the present disclosure. Additional blocks can be added or fewer blocks can be utilized, without departing from this disclosure. The example method can begin at block 201. The wireless charging method can include the following blocks.

At block 301, a direct current is converted to an alternative current.

At block 302, a wireless charging transmitter outputs a charging signal in a fast charging mode initially.

At block 303, a transmission temperature value of a transmission antenna of the wireless charging transmitter and a receiving temperature value of a receiving antenna of the wireless charging receiver are detected.

At block 304, if one of the transmission temperature value and the receiving temperature value is determined greater than an overheat value, then goes to block 305; if no, back to the block 302.

At block 305, the wireless charging transmitter outputs the charging signal in a slow charging mode. A first output power in the fast charging mode is greater than a second output power in the slow charging mode.

At block 306, if the transmission temperature value and/or the receiving temperature value are determined greater than a rating value, then, goes to block 307; if no, goes to the block 308.

At block 307, the wireless charging transmitter stops outputting the charging signal.

At block 308, if a changed receiving temperature value which is determined smaller than the overheat value drops down from a value greater than the overheat value, then, goes to block 309; if no, back to the block 306.

At block 309, the wireless charging transmitter switches the slow charging mode to the fast charging mode gradually.

The embodiments shown and described above are only examples. Many details are often found in the art such as the other features of a wireless charger and a wireless charging method. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size and arrangement of the parts within the principles of the present disclosure up to, and including, the full extent established by the broad general meaning of the terms used in the claims. It will therefore be appreciated that the embodiments described above may be modified within the scope of the claims.

What is claimed is:
1. A wireless charger, comprising:
  a wireless charging transmitter, comprising:
    a transmission antenna;
    a driving circuit coupled to the transmission antenna, and configured to output a charging signal in a fast charging mode initially;
    a transmission temperature sensor coupled to the transmission antenna, configured to detect a transmission temperature value of the transmission antenna; and
    a controller coupled to the driving circuit and the transmission temperature sensor, the controller being configured to receive the transmission temperature value from the transmission temperature sensor,
  wherein the driving circuit is configured to output the charging signal in a fast charging mode initially, when the transmission temperature value is greater than an overheat value, the controller is configured to control the driving circuit to output in a slow charging mode, and a first output power in the fast charging mode is greater than a second output power in the slow charging mode.

2. The wireless charger of claim 1, wherein the wireless charging transmitter further comprises an adapter, wherein the adapter is configured to convert a direct current to an alternative current.

3. The wireless charger of claim 1, wherein the wireless charging transmitter further comprises a transmission communication module, the wireless charger further comprises a wireless charging receiver, the wireless charging receiver comprises a receiving antenna, a receiving temperature sensor, and a receiving communicating module, the receiving temperature sensor is coupled to the transmission antenna, and is configured to detect a receiving temperature value of the receiving antenna, the receiving communicating module is configured to communicate with the transmission communication module, the controller is configured to receive the receiving temperature value from the receiving temperature sensor, when the receiving temperature value is greater than the overheat value, the controller is configured to control the driving circuit to output in the slow charging mode.

4. The wireless charger of claim 3, wherein when one of the receiving temperature value and the transmission temperature value is greater than a rating value, the controller is configured to stop the driving circuit outputting, and the rating value is greater than the overheat value.

5. The wireless charger of claim 1, wherein when the transmission temperature sensor detects a changed transmission temperature value which is smaller than the overheat value drops down from a value greater than the overheat value, the controller is configured to control the driving circuit to switch the slow charging mode to the fast charging mode gradually.

6. A wireless charger, comprising:
- a wireless charging receiver, comprising:
  - a receiving antenna;
  - a receiving temperature sensor coupled to the transmission antenna and configured to detect a temperature value of the receiving antenna; and
  - a receiving communicating module configured to communicate with the transmission communication module, and
- a wireless charging transmitter, comprising:
  - a transmission antenna;
  - a driving circuit coupled to the transmission antenna, and configured to output a charging signal in a fast charging mode initially; and
  - a controller coupled to the driving circuit, the controller being configured to receive the receiving temperature value from the receiving temperature sensor,
- wherein the driving circuit is configured to output the charging signal in a fast charging mode initially, when the receiving temperature value is greater than an overheat value, the controller is configured to control the driving circuit to output in a slow charging mode, and a first output power in the fast charging mode is greater than a second output power in the slow charging mode.

7. The wireless charger of claim 6, wherein the wireless charging transmitter further comprises an adapter, wherein the adapter is configured to convert a direct current to an alternative current.

8. The wireless charger of claim 6, wherein the wireless charging transmitter further comprises a transmission temperature sensor and a transmission communication module, the transmission temperature sensor is coupled to the transmission antenna and is configured to detect a transmission temperature value of the transmission antenna; the wireless charging receiver further comprises a receiving communicating module to communicate with the transmission communication module, when the transmission temperature value is greater than the overheat value, the controller is configured to control the driving circuit to output in the slow charging mode.

9. The wireless charger of claim 8, wherein when one of the receiving temperature value and the transmission temperature value is greater than a rating value, the controller is configured to stop the driving circuit outputting, and the rating value is greater than the overheat value.

10. The wireless charger of claim 6, wherein when the receiving temperature sensor detects a changed receiving temperature value which is smaller than the overheat value drops down from a value greater than the overheat value, the controller is configured to control the driving circuit to switch the slow charging mode to the fast charging mode gradually.

11. A method for wirelessly charging a remote device by a transmitting device, comprising:
- providing wirelessly from the transmitting device a charging power output at a first level;
- terminating the providing in response to either (a) a temperature of the transmitting device exceeds a first rated temperature threshold, or (b) receipt of a signal from the remote device representing that a temperature of the remote device exceeds a second rated temperature threshold;
- reducing the charging power output from the first level to a lower non-zero second power level, in response to (a) a temperature of the transmitting device is between a first overheat temperature threshold and the first rated temperature threshold, or (b) receipt of a signal from the remote device representing that a temperature of the remote device is between a second overheat temperature threshold and the second rated temperature threshold; and
- gradually increasing, after the reducing and in response to a temperature of the transmitting device being below the first overheat temperature threshold and a temperature of the remote device being below the second overheat temperature threshold, the charging power output from the second level to the first level.

12. The method of claim 11, further comprising: converting a direct current to an alternative current.

* * * * *